(12) United States Patent
Brueckner et al.

(10) Patent No.: US 8,224,502 B2
(45) Date of Patent: Jul. 17, 2012

(54) METHOD AND DEVICE FOR FAULT DETECTION IN THE LOAD PATH OF A SPINDLE ACTUATOR

(75) Inventors: Ina Brueckner, Breman (DE); Christoph Giebeler, Bremen (DE); Mark Heintjes, Weyhe (DE); Martin Recksiek, Hamburg (DE); Harald Rechter, Stuhr (DE); Markus Christmann, München (DE)

(73) Assignees: Airbus Operations GmbH, Hamburg (DE); EADS Deutschland GmbH, Ottobrunn (DE)

( * ) Notice: Subject to any disclaimer, the term of this patent is extended or adjusted under 35 U.S.C. 154(b) by 469 days.

(21) Appl. No.: 12/598,305

(22) PCT Filed: May 19, 2008

(86) PCT No.: PCT/EP2008/004004
§ 371 (c)(1),
(2), (4) Date: Oct. 30, 2009

(87) PCT Pub. No.: WO2008/141792
PCT Pub. Date: Nov. 27, 2008

(65) Prior Publication Data
US 2010/0125380 A1     May 20, 2010

(30) Foreign Application Priority Data
May 18, 2007 (DE) .......................... 10 2007 023 394

(51) Int. Cl.
*G01C 23/00* (2006.01)
(52) U.S. Cl. .......................................................... 701/3
(58) Field of Classification Search ....................... 701/3
See application file for complete search history.

(56) References Cited

U.S. PATENT DOCUMENTS 4,745,815 A    5/1988   Klopfenstein
5,092,539 A *   3/1992   Caero ........................ 244/99.9
(Continued)

FOREIGN PATENT DOCUMENTS

DE      10313728 A1    10/2004
(Continued)

OTHER PUBLICATIONS

International Search Report for corresponding PCT application PCT/EP2008/004004, Nov. 6, 2008.

(Continued)

*Primary Examiner* — Hussein A. Elchanti
(74) *Attorney, Agent, or Firm* — Matthew B. Dernier, Esq.; Gibson & Dernier LLP

(57) ABSTRACT

A method and a device for fault detection in the load path of a spindle actuator which is provided for actuating a high-lift flap of an aircraft, wherein the spindle actuator has a redundant load path which is formed by a spindle and a secondary connection which are connected rotationally fixedly to one another on the driven side and are coupled to the surface to be actuated and which are assigned separate load paths on the drive side, whereof the primary load path contains a primary spindle which is driven by a motor and can be fixed in its rotational movement by a primary brake, and the secondary load path contains the secondary inner connection, which is arranged concentrically in the primary spindle, which can be fixed in its rotational movement by a secondary brake, in which output signals representing the turning position of the spindle are detected and evaluated.

20 Claims, 4 Drawing Sheets

U.S. PATENT DOCUMENTS

| | | | |
|---|---|---|---|
| 5,241,722 A * | 9/1993 | Rohrlick et al. | 14/71.5 |
| 5,743,490 A | 4/1998 | Gillingham et al. | |
| 7,048,234 B2 | 5/2006 | Recksiek et al. | |
| 2005/0151027 A1 | 7/2005 | Recksiek et al. | |
| 2006/0237596 A1* | 10/2006 | Perez-Sanchez | 244/219 |
| 2010/0116928 A1* | 5/2010 | Cerne | 244/87 |
| 2011/0036955 A1* | 2/2011 | Karem | 244/7 |

FOREIGN PATENT DOCUMENTS

| | | |
|---|---|---|
| WO | 2007024220 A | 3/2007 |

OTHER PUBLICATIONS

International Preliminary Report on Patentability for corresponding PCT application PCT/EP2008/004004, Nov. 24, 2009.

* cited by examiner

METHOD AND DEVICE FOR FAULT DETECTION IN THE LOAD PATH OF A SPINDLE ACTUATOR

BACKGROUND

The invention relates to a method for fault detection in the load path of a spindle actuator which is provided for actuating an aerodynamically active surface, in particular a high lift surface of an aircraft, according to the preamble of claim 1, as well as a device for fault detection in the load path of such a spindle actuator according to the preamble of claim 11.

Document WO 2007/024220 A1 discloses a failure-tolerant redundant actuator system that is tolerant of single point failures.

In high-lift systems of aircraft common today, the individual high-lift surfaces or flaps are actuated in a manner mechanically coupled to one another by a central shaft line driven by a central drive. Such a centrally driven high-lift system is used, for example, in the Airbus A340 aircraft. However, forward-looking developments are going towards high-lift systems in which the flaps are actuated by electrically triggered individual drives. Such individually driven flaps make it possible to achieve high flexibility with regard to the actuation of the flaps and allows functionalities of the high-lift system which were not possible with the hitherto centrally driven flaps. A flap system having such individual drives is described, for example, in DE 103 13 728 A1. In one of the exemplary embodiments described therein, two individual drives are provided for actuating a single high-lift flap, which drives are coupled to the flap at positions spaced apart from one another and are electronically synchronised with one another as well as with the individual drives of the other flaps.

In order that the flaps of a high-lift system can reliably absorb the high aerodynamic loads occurring during their deployment without any undesirable change in their position, brakes are provided at suitable positions in the high-lift system by which means the shaft lines or drives can be fixed in the respective position as required. In particular, in the event of a rupture or other type of failure of load-bearing components in the high-lift system, which is highly improbable but cannot be excluded, such brakes should prevent any uncontrolled sudden change in the position of one or more of the high-lift flaps with the consequence of flying states which can possibly no longer be controlled.

The present requirements for safety in air transport require that firstly all critical load paths of said type should be designed as redundant so that in the event of failure of a primary load path, its function is at least partially taken over by a secondary load path and thus avoids a state which can no longer be controlled and secondly, that measures are taken for the early detection of already existing faults or faults being notified in the critical components of the high-lift system. In particular, it is important to avoid so-called "hidden failures" and to detect corresponding faults as far as possible within a flight cycle.

SUMMARY OF THE INVENTION

It is the object of the invention to provide an improved method and an improved device for fault detection in the load path of a spindle actuators of the type specified initially. In particular, early fault detection should be rendered possible, which can be carried out routinely without major increased expenditure and without maintenance activities.

Advantageous embodiments and further developments of the method and device are specified in the respective dependent claims.

BRIEF DESCRIPTION OF THE DRAWINGS

Exemplary embodiments of the method and device are explained hereinafter with reference to the drawings.

DETAILED DESCRIPTION OF THE INVENTION

Figure 1:
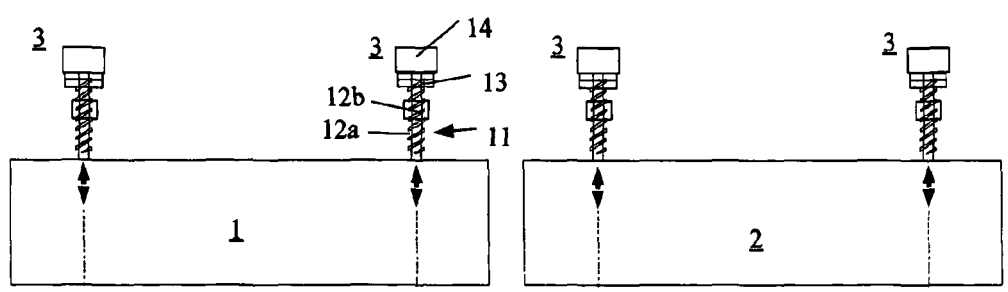
FIG. 1 is a schematic top view of two flaps of a high-lift system which are each actuated by two electronically triggered and synchronised drives, wherein the individual drives are implemented in the form of spindle drives with redundant load paths, according to one exemplary embodiment of the invention.

FIG. 1 shows schematically a top view of a part of a high-lift system of an aircraft, here in the form of two high-lift flaps 1, 2 provided on the wing trailing edge, each of which can be actuated by two individual drives 3. The individual drives 3 are configured in the form of spindle actuators which can each be driven by a motor 14. The spindle actuators 3 each have a primary spindle 11 bearing a thread 12a that cooperates with a spindle nut 12b. The spindle nut 12b is coupled to the respective flap 1, 2 in a manner known per se and not shown in detail in FIG. 1 such that when the spindle 11 rotates, a corresponding change in the flap position is effected. Further provided on each of the spindle actuators 3 is a respective primary brake 13 which serves to fix the primary spindle 11 in a predefined position and thus to fix the flap 1 or 2 against an undesired change of its position.

Figure 2:
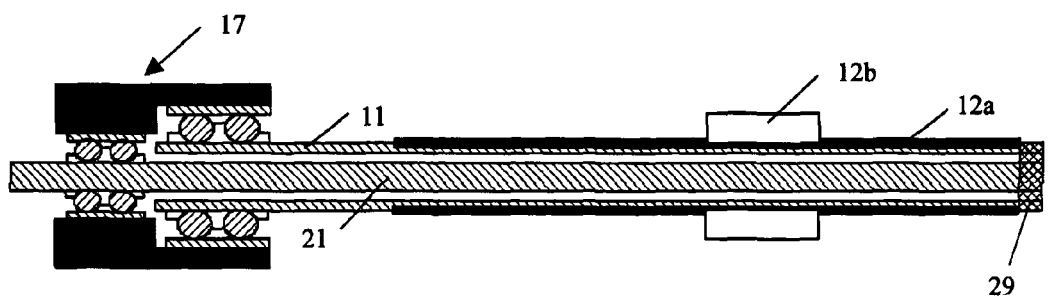
FIG. 2 is a schematic cross-sectional view through a spindle with redundant load path such as can be used in the individual drives of the high-lift system shown in FIG. 1.
Figure 3:
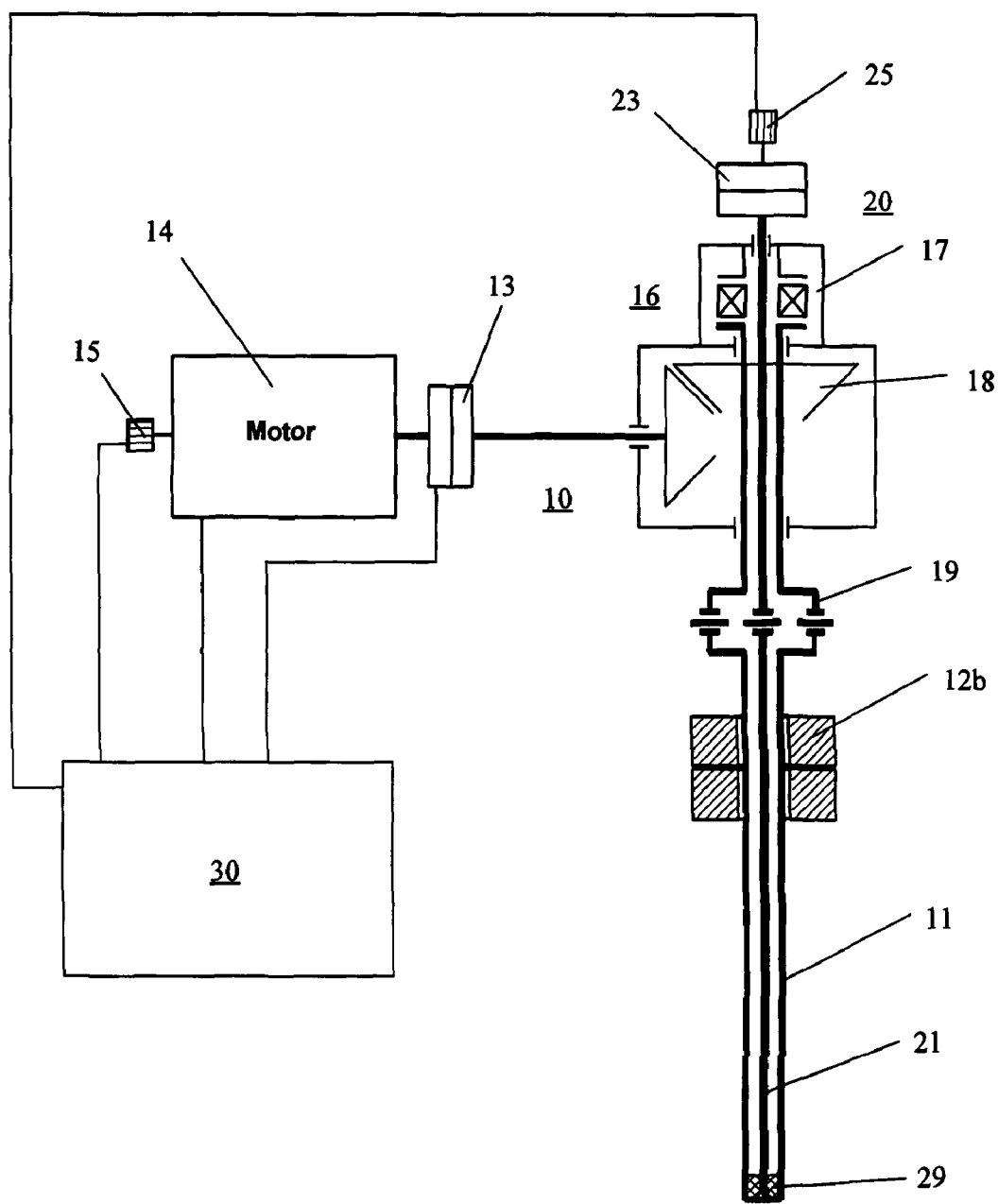
FIG. 3 is a schematic diagram, partially in the form of a block diagram, showing a spindle drive such as can be used as an individual drive in the exemplary embodiment of the high-lift system shown in FIG. 1.

As FIGS. 2 and 3 show in detail, each of the spindle actuators 3 is provided with a redundant load path which is substantially formed by two concentrically disposed spindles 11, 21 which are connected rotationally fixedly to one another on the driven side. The two spindles comprise a primary spindle 11 which is configured in the form of an exterior tube as well as a secondary inner connection 21 and which is disposed concentrically in said primary spindle. The concentrically disposed elements, spindle 11 and inner connection 21, are connected rotationally fixedly to one another on the driven side at 29 and are coupled to the surface 1, 2 to be actuated in a manner known per se. as has already been established previously, via the spindle nut 12b disposed on the primary spindle 11, which cooperates with the thread 12a provided there.

On the drive side, the spindle 11 and the inner connection 21 are assigned separate load paths 10, 20 of which a primary load path 10, cf. FIG. 3, which contains the primary spindle 11, can be driven by the motor 14 and can be fixed in the rotational movement by means of the primary brake 13 which has already been mentioned previously. A secondary load path 20 contains the inner connection or secondary spindle 21 which for its part can be fixed in its rotational movement by means of a secondary brake 23 provided as a further brake.

In the exemplary embodiment shown, the spindle head 16 contains a deflecting gear 18 by which means the primary load path 10 is brought together at right angles to the secondary load path 20. Provided between the spindle head 16 and the driven-side end of the spindle 11 and the secondary inner connection 21 is a double flange connection 19 which forms a detachable connection for both the primary spindle 11 and also for the inner connection 21.

Further provided on the drive-side end of the primary load path 10 comprising the primary spindle 11 and the secondary load path comprising the inner connection 21 are respective turning position sensors 15 or 25 which generate an output signal representing the instantaneous turning position of the respective spindle 11 and the inner connection 21 and therefore of the flap drive.

As shown in FIG. 3, at least the motor 14, the primary and secondary brakes 13 or 14 and the primary and secondary turning position sensors 15 or 25 are each coupled to a control and evaluation device 30 via corresponding control or signal lines. Further components which are not presented in the invention can also be coupled to the control and evaluation device 30 which can be part of a computer-controlled device for commanding the flaps of the high-lift system.

The evaluation device 30 is provided to carry out fault detection in the load path of the spindle actuator 3 which is based on the fact that a defined twisting is executed in the redundant load path 10, 20 by means of the motor 14 and this defined twisting is detected by means of the primary turning position sensor disposed on the primary spindle 11. In this case, an intact state of the spindle actuator 3 in which only a defined slight torque-dependent twist occurs inside the primary spindle 11 and the inner connection 21 can be clearly distinguished from a state in which a failure, for example, a rupture in the primary spindle 11 or a rupture in the secondary, inner connection 21 or at another point occurs in the primary load path 10 and/or in the secondary load path 20. In this case, larger twists would be detected since a defective load path cannot absorb the torque exerted thereupon or can only absorb it to a lesser extent.

At the same time, the inner connection 21 is fixed in its rotational movement by means of the secondary brake 23 and when the primary brake 13 is released, the load path 10, 20 is put under load with a predefined torque by the motor 14 from the primary spindle 11 via the driven-side rotationally fixed connection 29 of primary spindle 11 and secondary inner connection 21 as far as the secondary brake 23 which fixes said connection. This results in the said twisting within the redundant load path 10, 20 which is detected at the turning position sensor 15 coupled to the primary sensor 11. The detected change in the turning position $\Delta\phi$ is then checked as to whether it lies outside a tolerance range predefined for an intact spindle actuator and if this is the case, this is evaluated as the detection of a fault. This fault detection can be controlled by the control and evaluation device 30, for example, by software.

Figure 4:
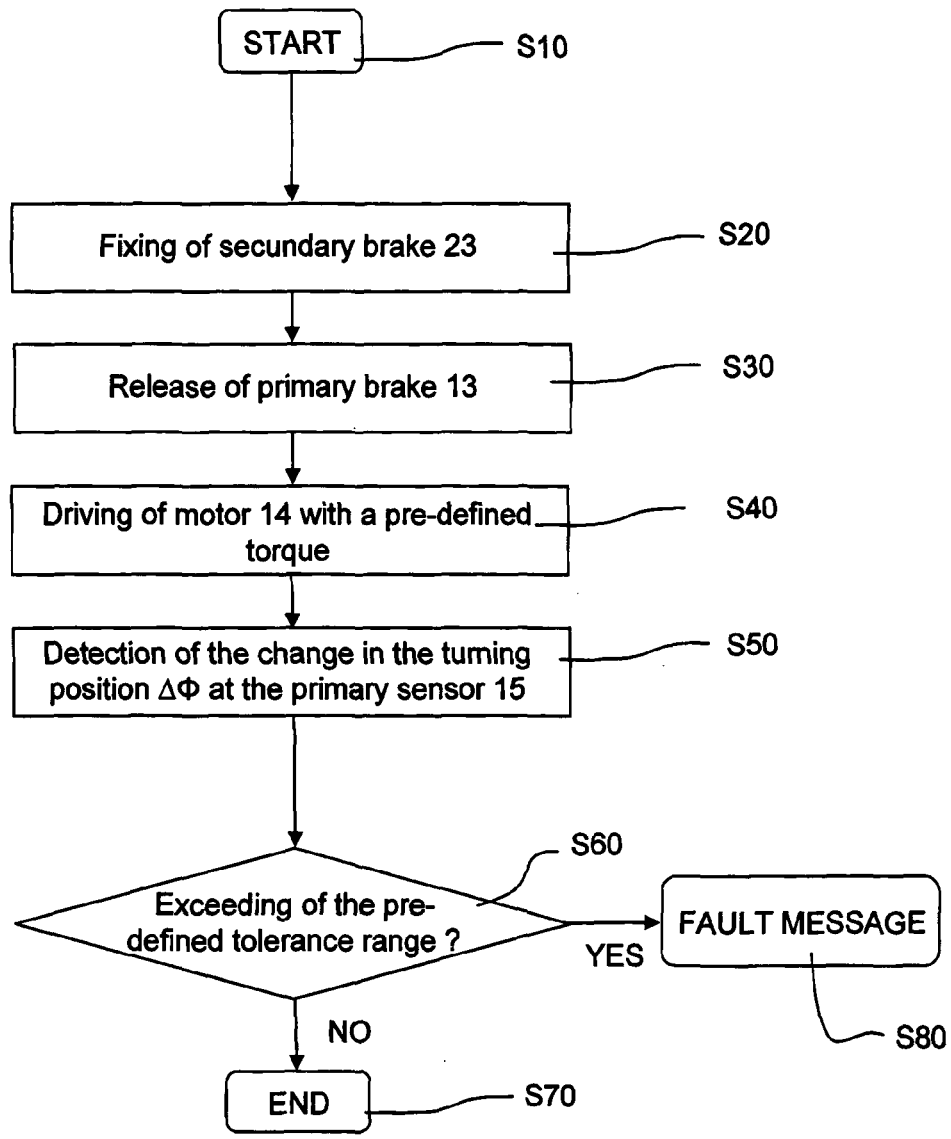
FIG. 4 shows a simplified flow diagram of the essential process steps in a fault detection according to an exemplary embodiment of the invention.

FIG. 4 shows an overview of the essential individual process steps in a fault detection executed in this manner. The fault detection is started in S10. The secondary brake 23 is fixed in 20. In S30 it is checked whether the primary brake 13 is released or optionally a corresponding signal is given. In S40 the motor 14 is driven with a predefined torque. In S50 the change in the turning position $\Delta\phi$ is detected at the primary position sensor 15. In S60 the change in the turning position $\Delta\phi$ detected at the primary position sensor 15 is compared with a predefined tolerance range. If the predefined tolerance range is not exceeded, the fault detection is considered to be terminated with negative result (S70), i.e. no fault was detected and the spindle actuator 3 is considered to be intact. However, if an exceeding of the predefined tolerance range is detected in S60, a fault message is output in S80 which states that a defect is present in the redundant load path 10, 20 of the spindle actuator 3.

The redundant load path 10, 20 can be put under load with a single predefined torque in the manner described and the change in the turning position $\Delta\phi$ detected at the primary turning position sensor 15 compared with a corresponding tolerance range.

However, it can also be provided that the redundant load path 10, 20 is put under load with different predefined torques and that the turning position changes detected by the turning position sensor 15 are compared with corresponding different respective tolerance ranges predefined for an intact spindle actuator 3.

Figure 5:
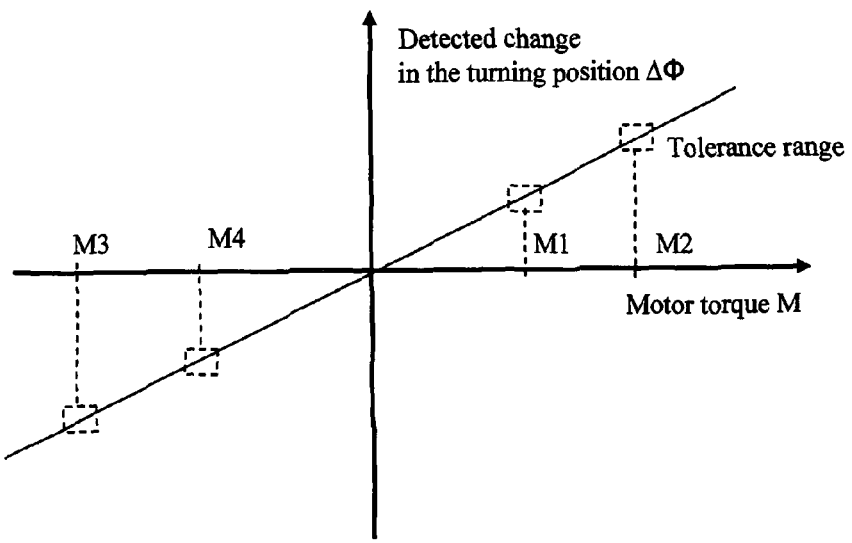
FIGS. 5 and 6 each show, in simplified diagrams, the dependence of a detected change in turning position on the torque exerted on the primary spindle according to exemplary embodiments of the invention.
Figure 6:
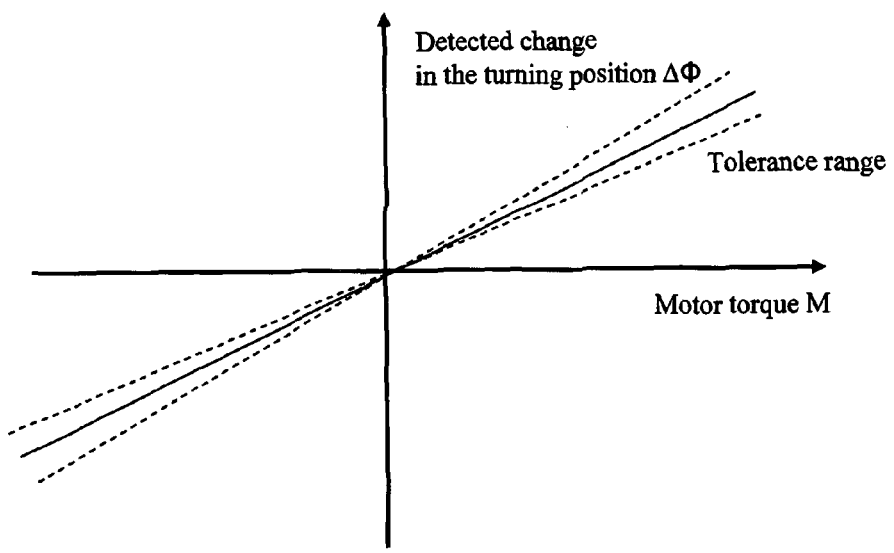

FIGS. 5 and 6 each show in simple diagram the dependence of the change in the turning position $\Delta\phi$ detected at the turning position sensor 15 coupled to the primary spindle 11 on the torque M exerted by the motor 14 on the primary spindle 11. Assuming that the elastic stiffness of the redundant load path 10, 20 against torsion is constant for small angles, the linear relationship between these two quantities shown in each case by a continuous line in FIGS. 5 and 6 is obtained.

In FIG. 5 the redundant load path 10, 20 is put under load with gradually increasing torque and the respectively detected change in the turning position $\Delta\phi$ is compared with corresponding different tolerance range predefined for an intact spindle actuator 3, which are depicted by dashed lines in the diagram.

In FIG. 6, on the other hand, the redundant load path 10, 20 is put under load with continuously increasing torque and accordingly, the detected change in the turning position $\Delta\phi$ is compared with a continuous tolerance range, which are defined by the dashed lines in the diagram.

For the fault detection, the redundant load path 10, 20 can either be put under load in one direction of rotation in accordance with the dependences shown in the right-hand side in diagrams 5 and 6 or the redundant load path 10, 20 can be successively or alternately put under load in both directions of rotation with predefined torques, i.e. the motor 14 is successively turned with a predefined torque first in one direction and then in the other direction and in each case the positive or negative change in the turning position $\Delta\phi$ is detected so that the relationships between motor torque M and change in the turning position $\Delta\phi$ shown on both sides in FIGS. 5 and 6 are obtained.

There is also the possibility for a self-test of all the brakes during a ground-check and testing the drive train for jamming by selectively releasing the individual brakes and generating torque by the motor.

Examples for the procedure:

Release both brakes 13, 23, then test for free running by introducing torque from the motor: If negative: one brake cannot be released or jamming (e.g. in the gears). The fault source can possibly be ascertained by measuring the stiffness of the drive train using the method already described.

Release primary brake 13, apply secondary brake 23 then test for free running by introducing torque from the motor 14. If free running: secondary brake 23 is not connecting or produces too little torque.

Release secondary brake 23, apply primary brake 13 then test for free running by introducing torque from the motor 14. If free running: secondary brake 23 is not connecting or produces too little torque.

A rupture of the drive train (primary or secondary path) would be detectable by inconsistency between the angle measured at the motor 14 with the sensor 15 there and the angle measured at the secondary brake 23 with the sensor 25 there, i.e. using a local computer so that during operating of the landing flaps, the brakes 13, 23 can be very rapidly activated locally to limit the fault effects.

Executing the rotationally fixed connection 29 so that this can also transfer axial loads but with defined axial play. This ensures that in the event of rupture of the primary path 10, the axial load can be taken over by the secondary path 20 and the secondary axial bearing but the secondary path 20 is free from axial loads in the fault-free state of the drive.

The control and evaluation device 30 can be provided to record and store the change in the turning position A detected at the turning position sensor 15 as a function of the torque generated by the motor 14.

The fault detection can be repeated cyclically, preferably in a specific phase of each flight cycle, for example, at the beginning of a flight cycle on the ground before take-off and/or at the end of a flight cycle, again on the ground after landing. Thus, the test can be carried out in a phase of the flight cycle which is not critical for defective behaviour in the spindle actuator 3 and can be brought about in the fastest possible maintenance activity.

For logging the state of the spindle actuator 3, the recorded and stored data of various successive fault detection processes can be compared with one another and their chronology evaluated. This can be used, for example, to detect in good time incipient fatigue or another defect which is becoming apparent (e.g. increased play of the gears) in the redundant load path 10, 20 and remedy this before a manifest failure occurs.

The fault detection according to the invention allows the use of sensors already present in the high-lift system so that no additional installation expenditure is required. Also, no additional fault source can be introduced by additional components. The fault detection method can be implemented by software in a control and evaluation device which is already provided. It is possible to detect a possible fault in any flight cycle at one or several particular time points. Repair and maintenance work can be specifically targeted.

REFERENCE LIST

1 Flap
2 Flap
3 Spindle actuator
10 Primary load path
11 Primary spindle
12a Thread
12b Spindle nut
13 Primary brake
14 Motor
15 Primary turning position sensor
16 Spindle head
17 Axial bearing
18 Deflecting gear
19 Double flange connection
20 Secondary load path
21 Secondary (inner) connection
23 Secondary brake
25 Secondary turning position sensor
29 Rotationally fixed connection
30 Control and evaluation device

The invention claimed is:

1. A method for fault detection in the load path of a spindle actuator which is provided for actuating an aerodynamically active surface, in particular a high-lift flap of an aircraft, wherein the spindle actuator has a redundant load path which is formed by a spindle and a secondary connection which are connected rotationally fixedly to one another on the driven side and are coupled to the surface to be actuated and which are assigned separate load paths on the drive side, whereof the primary load path contains a primary spindle which is driven by a motor and can be fixed in its rotational movement by a primary brake, and the secondary load path contains the secondary inner connection, which is in particular arranged concentrically in the primary spindle, which can be fixed in its rotational movement by a secondary brake, in which output signals representing the turning position of the spindle, which are generated by means of at least one turning position sensor which is coupled to the primary spindle on the drive side, are detected and evaluated, wherein the method comprises:
 fixing the secondary connection in its rotational movement by means of the secondary brake;
 putting the redundant load path under load, when the primary brake is released, the load being applied via a predefined torque by the motor as far as the secondary brake is fixing the secondary connection; and
 evaluating the detection of a fault when a change in the turning position, which lies outside the tolerance range predefined for an intact spindle actuator, is detected at the turning position sensor coupled to the primary spindle.

2. The method according to claim 1, wherein the redundant load path is put under load with different predefined torques and the changes in the turning position detected at the turning position sensor coupled to the primary spindle are compared with corresponding different tolerance ranges predefined for an intact spindle actuator.

3. The method according to claim 2, wherein the redundant load path is put under load with gradually increasing torque.

4. The method according to claim 2, wherein the redundant load path is put under load with continuously increasing torque.

5. The method according to claim 1, wherein the redundant load path is successively put under load in both directions of rotation with predefined torques.

6. The method according to claim 1, wherein the change in turning position detected at the turning position sensor coupled to the primary spindle is recorded as a function of data representing the torque produced by the motor and stored.

7. The method according to claim 1, wherein the fault detection is repeated cyclically.

8. The method according to claim 7, wherein the fault detection is carried out at the beginning of a flight cycle on the ground before take-off.

9. The method according to claim 7, wherein the fault detection is carried out at the end of a flight cycle on the ground after landing.

10. The method according to claim 6, wherein:
 the fault detection is carried out at the beginning of a flight cycle on the ground before take-off; and
 the recorded and stored data of several different fault detection processes are compared with one another and evaluated.

11. A device for fault detection in the load path of a spindle actuator which is provided for actuating an aerodynamically active surface, in particular a high-lift surface of an aircraft, wherein the spindle actuator has a redundant load path which is formed by a spindle and a secondary connection which are connected rotationally fixedly to one another on the driven side and are coupled to the surface to be actuated and which are assigned separate load paths on the drive side, whereof the primary load path contains a primary spindle which can be driven by a motor and can be fixed in its rotational movement by a primary brake, and the secondary load path contains the secondary inner connection, which is in particular arranged concentrically in the primary spindle, which can be fixed in its rotational movement by a secondary brake, and comprising at least one turning position sensor which is provided on the drive side with the primary spindle for generating output signals representing the turning position of the spindle, and comprising a control and evaluation device which is coupled at least to the motor, the primary brake and the primary position sensor and is provided for detecting and evaluating output signals representing the turning position of at least the primary spindle, wherein:

the control and evaluation device comprises a fault detection function which:
applies the secondary brake for fixing the secondary connection in its rotational movement, releases the primary brake and puts the redundant load path under load with a predefined torque by the motor driving the primary spindle as far as the secondary brake fixing the secondary connection,
detects the change in the turning position by means of the primary position sensor, and
delivers an output signal indicating the detection of a fault when a change in the turning position, which lies outside the tolerance range predefined for an intact spindle actuator, is detected by the turning position sensor.

12. The device according to claim 11, wherein the control and evaluation device is provided to put the redundant load path under load with different predefined torques and to compare the changes in the turning position detected at the turning position sensor coupled to the primary spindle with corresponding different tolerance ranges predefined for an intact spindle actuator.

13. The device according to claim 12, wherein the control and evaluation device is provided to put the redundant load path under load with gradually increasing torque.

14. The device according to claim 12, wherein the control and evaluation device is provided to put the redundant load path under load with continuously increasing torque.

15. The device according to claim 11, wherein the control and evaluation device is provided to put the redundant load path successively under load in both directions of rotation with predefined torques.

16. The device according to claim 11, wherein the control and evaluation device is provided to record and store the change in turning position detected at the turning position sensor coupled to the primary spindle as a function of data representing the torque produced by the motor.

17. The device according to claim 11, wherein the control and evaluation device is provided to repeatedly carry out the fault detection cyclically.

18. The device according to claim 17, wherein the control and evaluation device is provided for fault detection at the beginning of a flight cycle on the ground before take-off.

19. The device according to claim 17, wherein the control and evaluation device is provided for fault detection at the end of a flight cycle on the ground after landing.

20. The device according to claim 16, wherein:
the control and evaluation device is provided for fault detection at the beginning of a flight cycle on the ground before take-off; and
the control and evaluation device is provided for comparing and evaluating the recorded and stored data of several different fault detection processes.

* * * * *